United States Patent [19]

Do et al.

[11] Patent Number: 4,680,524
[45] Date of Patent: Jul. 14, 1987

[54] MECHANISM FOR POSITIONING AN OUTPUT MEMBER

[75] Inventors: Phuc K. Do, Charlotte; Joel G. Goodwin, Concord; Nicholas J. Krull, Charlotte, all of N.C.

[73] Assignee: IBM Corporation, Armonk, N.Y.

[21] Appl. No.: 852,255

[22] Filed: Apr. 15, 1986

[51] Int. Cl.⁴ .............................................. H02P 8/00
[52] U.S. Cl. .................................... 318/696; 318/685
[58] Field of Search ................. 318/696, 685; 368/157

[56] References Cited

U.S. PATENT DOCUMENTS 4,340,946  7/1982  Kanno et al. ........................ 368/76
4,361,410  11/1982  Nakajima et al. .................... 368/157

Primary Examiner—William M. Shoop, Jr.
Assistant Examiner—Saul M. Bergmann
Attorney, Agent, or Firm—R. M. Chiaviello, Jr.

[57] ABSTRACT

This invention relates to a mechanism for positioning an output member of a mechanical system and in particular a mechanical system that has backlash present. The mechanism has a step motor, regulated by control means, connected to the output member by a mechanical transmission. The control means delivers units of electrical energy to the step motor in response to a number of steps specified to be moved. The control means also has means for detecting whether the step to be performed by the step motor is a single remaining step or single step only. The control means responds to detection of the single remaining step or detection of the single step only by applying a unit of energy to the step motor at a rate that is substantially slower than the rate that would be applied for the other steps.

7 Claims, 6 Drawing Figures

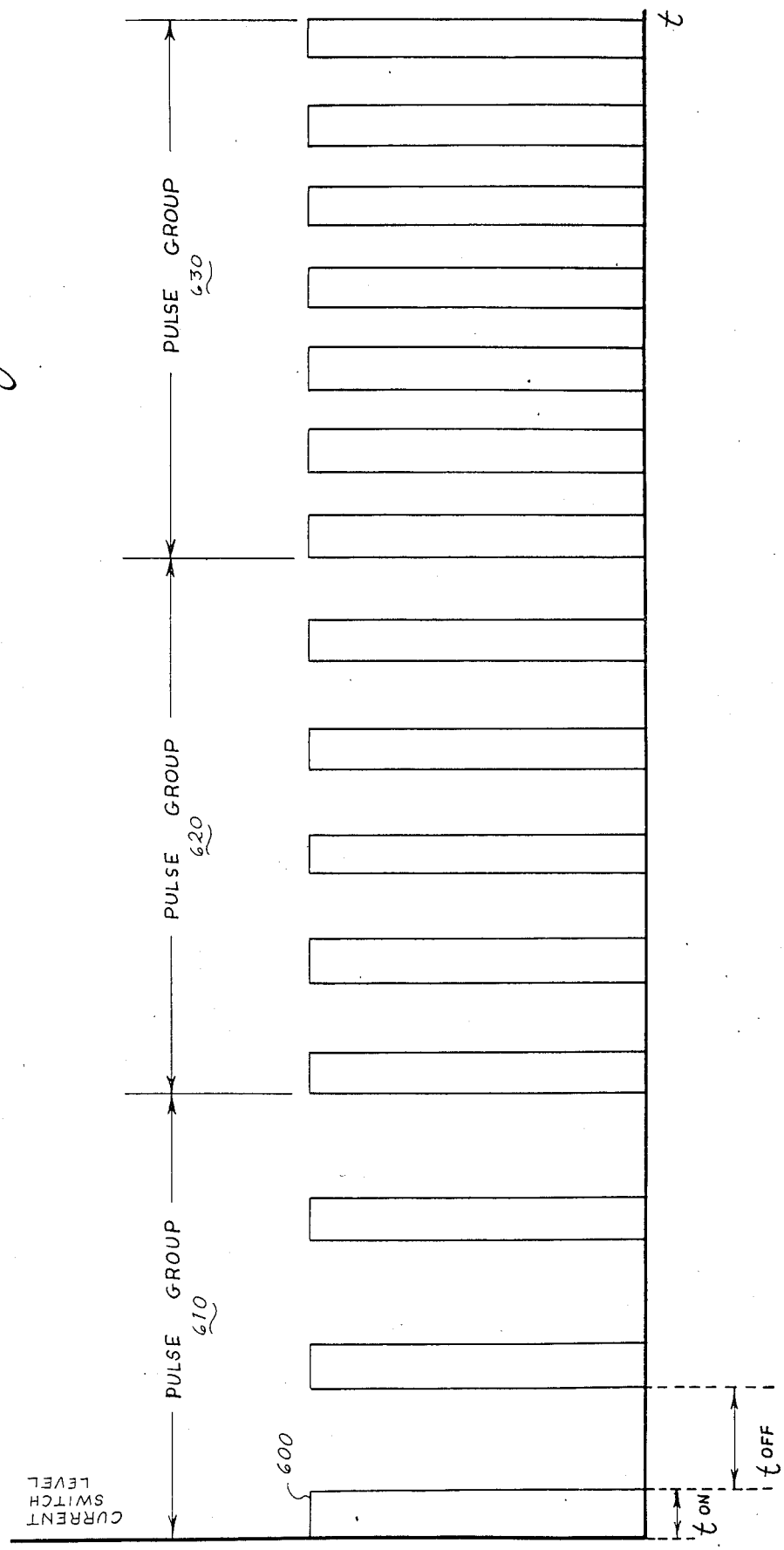

MECHANISM FOR POSITIONING AN OUTPUT MEMBER

BACKGROUND OF THE INVENTION

1. Technical Field of the Invention

This invention relates to a mechanism for positioning an output member of a mechanical system driven by a step motor under the operation of a control system. Step motors controlled in accordance with the invention are capable of driving a mechanical system where backlash is a substantial percentage of a single step. The control system of this invention is implemented in microcode for maximum flexibility.

2. Description of the Prior Art

Step motors are widely used in the control of mechanical systems; and, in particular, mechanical systems that are used in association with information handling equipment. A step motor is particularly suited for such use because it is a digital device; movement occurs in incremental steps based upon discrete input pulses. Examples of step motor applications are disk and tape drives, computer printers and robot manipulators. These applications generally incorporate a step motor as a drive means for a mechanical system that requires very precise and accurate movement. This precision and accuracy is achieved by the small steps the step motor can make. A limitation occurs when a single step of the step motor is of the same order of magnitude as the backlash in a mechanical system. A continuing problem facing this art is the design of suitable control systems that both optimize the step motor performance and provide consistent and accurate response by the mechanical system being driven.

In a step motor driven mechanical system there is an intermediate mechanical element such as a transmission connecting a step motor to an output member. For example, the mechanical system includes a plurality of gears that mesh with one another. In such a device, the tooth of one gear interacts with the inter-tooth space of a second gear to impart motion to that second gear. Due to manufacturing tolerances, the distance between adjacent gear teeth, or inter-tooth space, is greater than the gear tooth with which it is to mesh. When the step motor and drive gear stop abruptly, the driven gear will continue to move until one of the driven gear teeth collide with the drive gear tooth causing the driven gear to oscillate and the system to recoil. This is known as backlash and is an especially difficult problem to control in any application where a single step of the step motor is of the same order of magnitude as the backlash in the system.

Various solutions have been proposed for this recurring problem. Those solutions include mechanical damping, deceleration ramping or controlling the timing between steps, electronic braking of the motor and, finally, monitoring the output position of the system to control the input signal. All four methods have significant disadvantages. Mechanical systems such as the helix screw and anti-backlash nut are complicated and costly to implement. In addition, such a mechanical system is generally designed for a specific device and cannot be used for other applications. Deceleration ramping is an adequate solution if the particular application always calls for a plurality of steps, however, for many applications, this technique is inadequate for driving the step motor a single step. In electronic braking, current is allowed to flow temporarily in the inactivated coils to apply a counter or reverse drive force to the rotor. Electronic braking requires some combination of complicated circuitry to control the reverse current flow, a more sophisticated and expensive motor or a reverse polarity power supply. Any of the foregoing requirements is costly. Another disadvantage of electronic braking is that it is complicated to design and implement and does not lend itself to single step applications. The fourth prior art technique is monitoring the position of the output member to control the drive signals fed to the motor so that backlash error is acceptably low. This technique is a complicated technique which is difficult to design and implement. It has the added disadvantage of not being suitable for applications requiring only single step moves at one time. All these disadvantages of the prior art have been overcome by this invention.

The advantages of this invention include significant improvement in controlling the rotational acceleration of a step motor rotor while minimizing the effects of backlash inherent in the mechanical system. Another advantage of this invention is that full current is applied during the final or single step move thus maximizing the positional accuracy of the rotor while also being adaptive to load changes. Another advantage of the invention is that it is particularly suited for applications requiring only a single step move of the rotor.

Another advantage of the invention is that the same consistency and level of accuracy is achieved as is obtained using complicated and expensive precision mechanical linkages and anti-backlash gears. Another advantage of this invention is that it provides a means for controlling the output member without monitoring the response of that output member. Another advantage of this invention is that it is particularly useful for systems requiring moves of a single step only yet is practical for driving the step motor at rated speeds while maintaining control over motor acceleration/deceleration.

Additional advantages of this invention are that complicated circuitry is not required, it is simple to design and implement and is flexible enough to be useful for numerous varied applications.

SUMMARY OF THE INVENTION

Our invention provides a step motor driven mechanism that is capable of moving an output member to a precise position, without the expense and complexity characteristic of prior art mechanisms. This precision is achieved by reducing the rate at which energy is supplied to drive the motor through its last step.

Ordinarily, the energy supplied for causing a step motor to move through one step is supplied as a pulse or unit that is applied at a time when the rotor of the motor is positioned relative to poles, or stator coils, being energized, such that a maximum torque is realized. Our invention alters the rate at which the final or positioning unit of energy is applied so that little energy is applied when the rotor is positioned to receive maximum torque. The energy is applied slowly, increasing exponentially to a maximum that occurs at a time when the poles being energized can apply relatively little torque, but can exert an effective restraining force on the rotor as it slows gently to a stop. By stopping the rotor in this manner, the normal tendency of the rotor to oscillate or "ring" is effectively averted. Further, the mechanism driven by the motor is slowed by its own inherent damping without overshoot or backlash.

It is convenient to provide stepping energy units to a motor as a series or burst of short pulses because of efficiencies in the switching elements and control circuits that are available for use. The preferred implementation of our invention provides the final or positioning energy unit as such a series of pulses, but one in which the pulses are first supplied at a low frequency that increases with time. This arrangement is a particularly effective way of controlling a motor by a microprocessor since the rate at which pulses are supplied is conveniently programmed simply as a series of time intervals. We have found that it is desirable to provide a somewhat different time rate profile for the positioning energy unit that produces a single step than is provided for the unit for moving the rotor through the last of a series of steps. This different rate profile is readily accomplished by programming an alternate series of time intervals and logic that recognizes the occurrence of a single step.

It can now be recognized that our invention can be applied to any existing microprocessor controlled step motor driven mechanism by adding only the programming necessary to recognize the last step and to substitute a modified energy unit for driving the motor through the last step. The mechanical system driven by the motor will in turn be enhanced without further modification by giving the appearance of having little or no backlash.

BRIEF DESCRIPTION OF THE DRAWINGS

For a better understanding of the invention, reference is had to the following description taken in connection with the accompanying drawings, in which:

FIG. 6 is a timing diagram illustrating the energy unit for the single remaining step or the single step only comprising a series of current pulses of increasing frequency.

DESCRIPTION OF THE PREFERRED EMBODIMENTS

Figure 1:
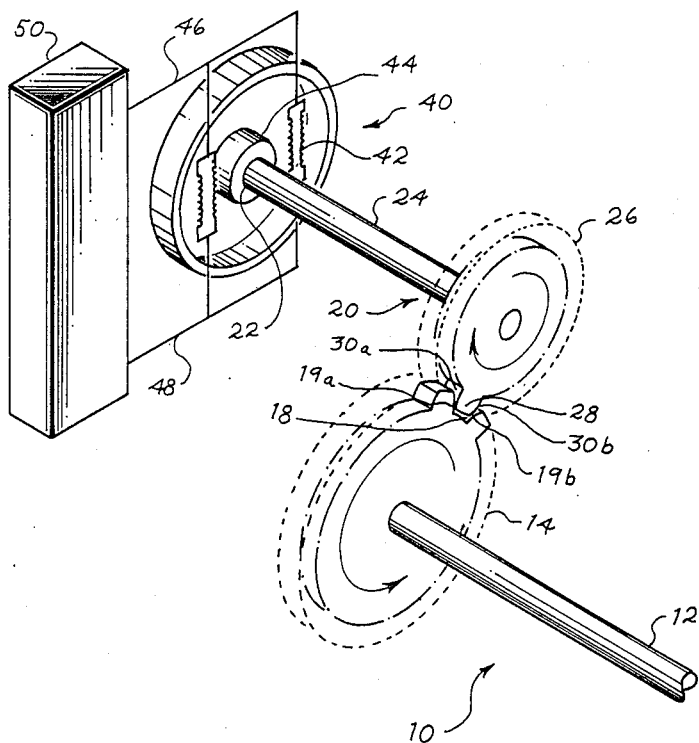
FIG. 1 is a diagram illustrating a mechanism for positioning an output member.

Referring to FIG. 1, a mechanism for positioning an output member 10 includes a step motor 40 connected to the output member by means of mechanical transmission 20. Step motor 40 is controlled by control means 50. Step motor 40 has a plurality of energizable stator coils 42 for advancing a rotor 44. The control means 50 provides a movement command on coil select line 48 that specifies the number of steps to be performed by step motor 40 to move output member 10 to a desired position. A unit of electrical energy is supplied to the stator coils from control means 50 along current line 46.

Rotor 44 of step motor 40 is connected to transmission shaft 24 of mechanical transmission 20 by motor coupling 22 so that each step of rotor 44 results in a proportional movement in transmission shaft 24. The movement of transmission shaft 24 is imparted to drive gear 26 which is drivingly connected to output member 10. Drive gear 26 has a plurality of drive gear teeth 28 each of which has gear teeth outer edges 30a and 30b. The drive gear teeth 28 mesh with the inter-teeth spaces 18 of output gear 14 so that rotation of drive gear 26 in a clockwise direction results in rotation of output gear 14 in a counter-clockwise direction. Output gear 14 is drivingly connected to output shaft 12 of output member 10 such as a feed roll for a printer. Alternatively, output shaft 12 would be a linear conversion device such as a helix screw (not shown) for providing motion function to a print head in a computer printer.

Still referring to FIG. 1, backlash occurs when drive gear teeth 28 do not completely fill the inter-teeth spaces 18 of output gear 14; in other words, output gear 14 does not mesh tightly with drive gear 26. To illustrate: as drive gear 26 rotates clockwise, gear tooth outer edge 30a impinges upon adjacent gear tooth inner edge 19a to impart a counter-clockwise rotational motion to output gear 14. When drive gear 26 comes to an abrupt stop, output gear 14 will continue to rotate in a counter-clockwise direction until adjacent gear tooth inner edge 19b impinges upon gear tooth outer edge 30b which will next cause rotational motion of output gear 14 in a clockwise direction until adjacent gear tooth inner edge 19a collides with gear tooth outer edge 30a at which point the motion of output gear 14 will be reversed. These oscillating collisions and motion reversals will continue until the system settles due to the natural damping action of the frictional forces inherent in the system. It is also possible that the oscillating collisions will cause drive gear 26 to change rotational direction. In either case there is a reduction of positional accuracy due to backlash. The amount of backlash in the system will be a function of how loosely the gears mesh and becomes especially significant when the degree of backlash is a substantial percentage of a single step of rotor 44.

Figure 2:
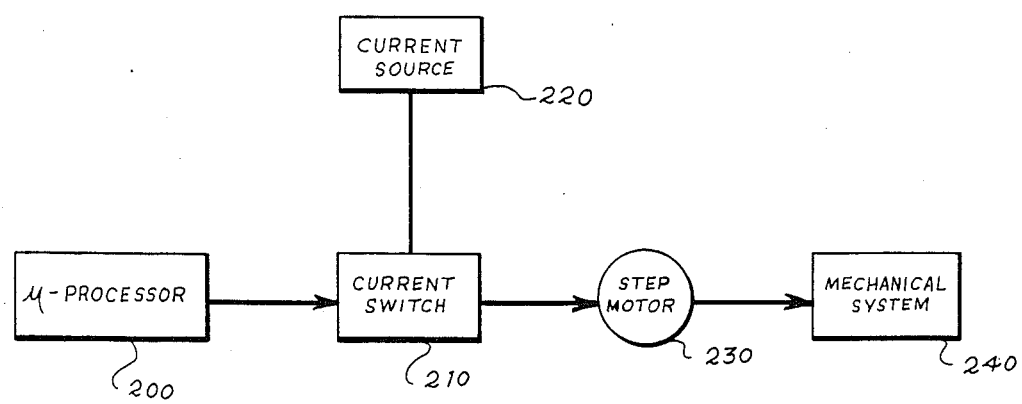
FIG. 2 is a block diagram illustrating the relationship among the various components of the invention.

Referring now to FIG. 2, a block diagram of the invention includes microprocessor 200 for operating and controlling current switch 210. Associated with current switch 210 is current source 220 for supplying electrical energy to step motor 230 through current switch 210. Step motor 230 responds to the supply of electrical energy from current switch 210 by performing a number of steps to drive mechanical system 240 to a desired position.

Figure 3:
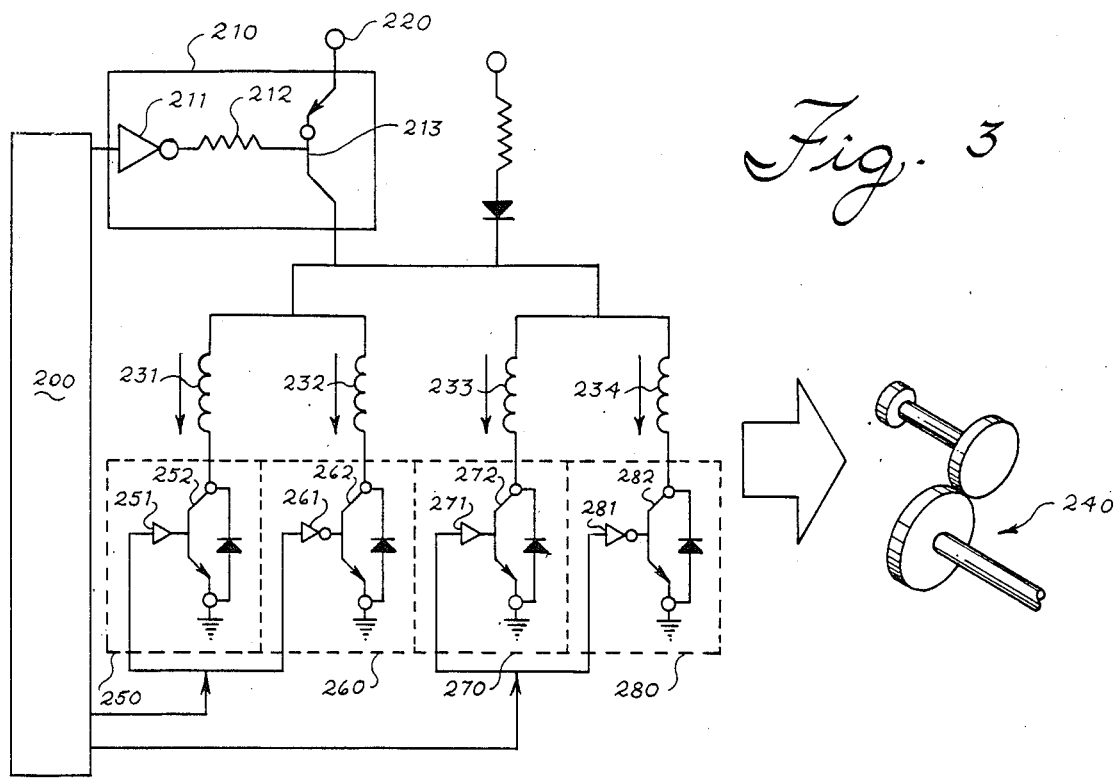
FIG. 3 is a circuit for controlling the movement of a step motor in accordance with the invention.

Referring now to FIG. 3, there is shown a circuit for controlling a step motor in accordance with the invention. Microprocessor 200 is connected to current switch 210 for controlling current switch 210 in accordance with a programmed set of operations. Current switch 210 includes inverter 211 connected in series with resistor 212 to the base of transistor 213. When transistor 213 is conducting, current flows from current source 220 through transistor 213 to stator windings 231, 232, 233 and 234 of step motor 230. The step motor imparts motion to mechanical system 240 through a rotor (not shown) that is stepped by the sequential activation of stator windings 231 through 234. The activation of those windings is also controlled by microprocessor 200 which is connected to stator winding activation switches 250, 260, 270 and 280. Activation switches 250 and 270 include input buffers 251 and 271 connected respectively to the bases of transistors 252 and 272. When the transistors are conducting, in response to an appropriate signal from microprocessor 200, the associated stator winding will be activated and current will flow from current source 220 through transistor 213, when it is switched on, to ground through the associated stator winding/transistor pair. Similarly for stator windings 232 and 234 there are stator winding activation switches 260 and 280 respectively. Both stator winding activation switches 260 and 280 include an inverter 261, 281 connected to the base of transistor 262, 282. Input buffer 251 and inverter 261 are connected to the same output of microprocessor 200 so that when switch 250 is on, activating stator winding 231, switch 260 is off and stator winding 232 is not activated. Likewise, input buffer 271 and inverter 281 are connected to an output of microprocessor 200 so that when stator winding 233 is activated stator winding 234 is not activated. The selective activation of stator windings 231 through 234 by microprocessor 200 imparts rotational motion to the rotor of step motor 230.

Figure 4:
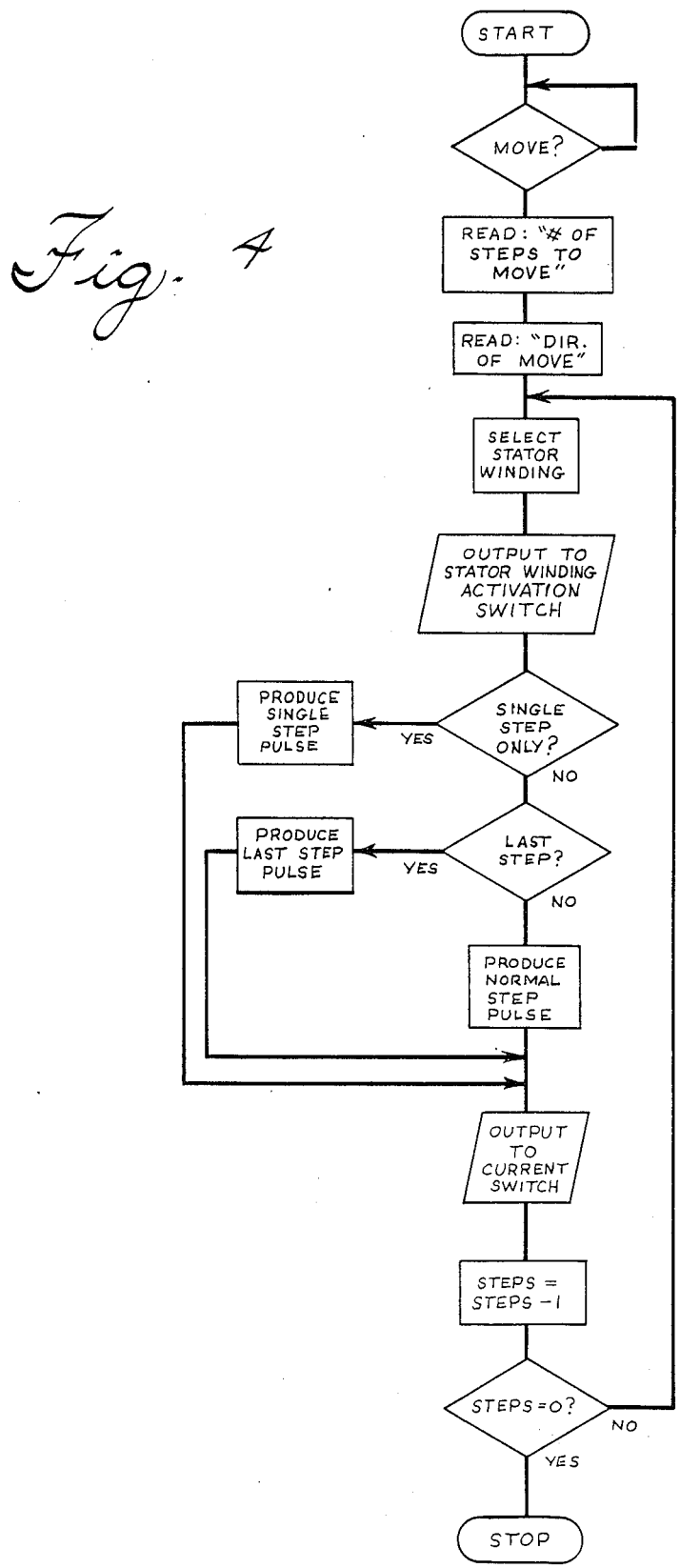
FIG. 4 is a flow chart illustrating the series of steps for practicing the preferred embodiment.

Referring now to FIG. 4, a flow chart describes the information necessary for programming microprocessor 200. When a move command is received, the first step is to read the number of steps to move and the direction of the move. The next step is to select the appropriate stator winding and output a signal to the selected stator winding activation switch. After the stator winding has been activated, it is determined whether the move will be a single step only. If it is to be a single step only move, a single step pulse is produced which is then made an output to a current switch. If it is not to be a single step move, it is determined whether the move step is the last step. If it is the last step, a last step pulse is produced which is then made an output to the current switch. If the move step is not single step only or a last step then a normal step pulse is produced which then outputs to the current switch. The next step is to determine whether the move has been completed. If it has not been completed, the next stator winding is selected and the sequence of steps begins again at that point. If the move has been completed, the sequence stops.

Figure 5:
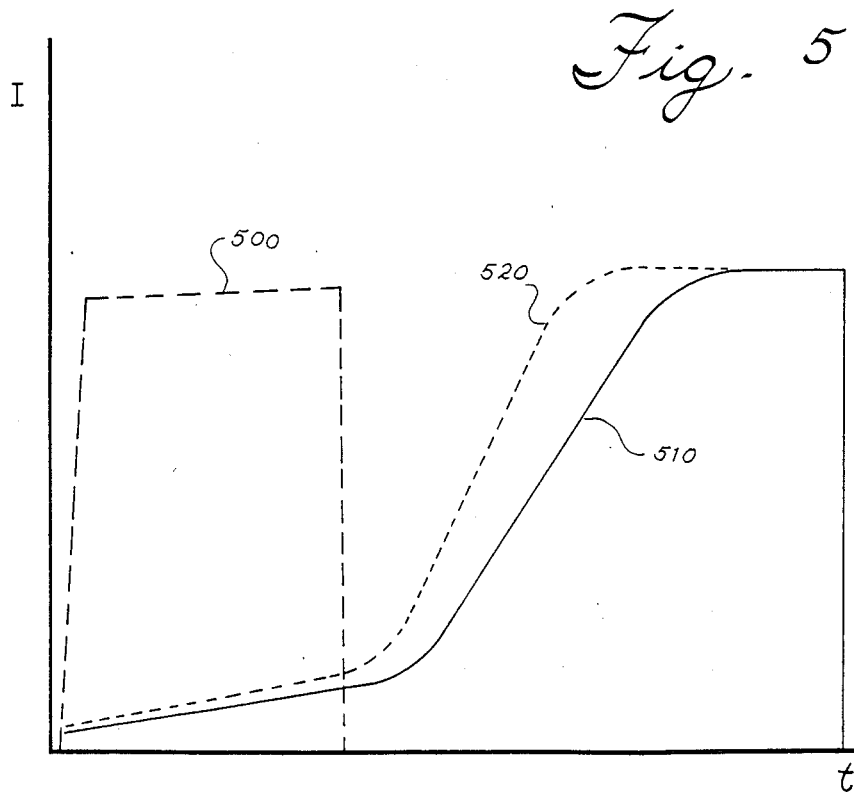
FIG. 5 illustrates wave forms depicting the energy profile of units of energy delivered to the step motor during a succession of steps, during the remaining single step to be performed and during a single step only.

Referring now to FIG. 5, wave form profile 500 depicts the unit of electrical energy delivered to stator coils 42 of step motor 40 to move rotor 44, of FIG. 1, a specified number of steps greater than one. Wave form profile 510 depicts the unit of electrical energy of this invention that can be applied to step motor 40 in either the case of a single remaining step or a single step only. Wave form profile 510 has the characteristic feature that the energy delivered to step motor 40 is delivered at a rate substantially slower than the rate at which energy is supplied by the units of electrical energy depicted in wave form profile 500. In the preferred embodiment, a distinction is made between the cases of a single or last remaining step and a single step only. In a single step only, the unit of electrical energy depicted by wave form profile 520 is applied to step motor 40. Wave form profile 520 illustrates a faster rate of applying energy to step motor 40 than that illustrated by wave form profile 510, however, the rate of applying energy to the step motor 40 remains substantially slower than that illustrated by wave form profile 500. It should be noted that the total energy applied to step motor 40 during a single remaining step or a single step only is greater than the total energy supplied by an individual pulse of a series of move pulses. The particular wave forms illustrated are for the preferred embodiment. Other wave forms are contemplated, however, and are deemed within the scope of this invention.

Referring now to FIG. 6, a set of equal width timing pulses 600 are shown separated by varying amounts of time. The timing diagram of FIG. 6 illustrates a series of current pulses of electrical energy supplied to the step motor for the single step only or last remaining step move in accordance with this invention. As is shown in FIG. 6, there are three groups of pulses 610, 620 and 630. The frequency of pulse group 610 is lower than the frequency of pulse group 620 which in turn is lower than the frequency of pulse group 630. The frequency and length of the pulse groups is selected to most precisely conform to the wave form profiles 510 and 520 of FIG. 5. In the illustrated embodiment, pulse group 610 consists of three pulses of equal width and frequency f1. Pulse group 620 consists of five pulses having the same width as the pulses of group 610 but of a frequency f2. Pulse group 630 consists of seven pulses of frequency f3, and like pulse groups 610 and 620, the pulses are of equal width. The various frequencies of the pulse groups are selected by programming microprocessor 200 to produce a pedestal up signal for one time period, to produce a pedestal down signal for an amount of time that varies for each pulse group and then repeat the pedestal signals for the total number of pulses in the group. The microprocessor 200 can be programmed with two, three or more sets of data each specifying a different series of time sequences or frequencies for each of the pulse groups. If other wave forms are selected, a different group of pulses would be selected as is well known by those skilled in the art.

It is also possible to vary the width of the individual pulses 600, the number of pulses in a pulse group or to vary the number of pulse groups as is deemed appropriate. Any of the foregoing methods for producing an energy unit for the last remaining step or the single step only moves are contemplated to be within the scope of this invention.

In summary, the mechanism for positioning an output member of this invention comprises a step motor, a mechanical transmission connecting the step motor to the output member and means for controlling the step motor. The controlling means further comprises means for providing a movement command specifying a number of steps to be performed by the step motor; means for delivering units of electrical energy to the step motor; means for detecting the condition that a single step remains to be performed; and means for selectively supplying electrical energy units to the step motor at different energy time rates.

The means for delivering units of electrical energy is responsive to the number of steps to be performed by the step motor and delivers the energy units in succession to the motor. Each of the energy units urges movement of the motor, as well as the output member, in the same direction. The means for selectively supplying electrical energy units to the step motor at different energy time rates is responsive to whether a single remaining step is detected. If a single remaining step is detected, the rate at which an energy unit for a single remaining step delivers energy to the step motor is substantially slower than the rate at which energy is supplied by the units delivered for the other steps specified to be performed by the step motor.

In the preferred embodiment, the means for delivering units of electrical energy is also responsive to whether a single step only is to be performed. If a single step only is detected, energy is supplied to the step motor at a rate that is substantially slower than the rate at which energy is supplied by the units delivered for the other steps, but which is faster than the rate at which energy is supplied for the single or last remaining step of a series of steps.

It is intended that all matter contained in the foregoing description or shown in the accompanying drawings shall be interpreted as illustrative and not in a limiting sense. While the invention has been particularly shown and described with reference to the preferred embodiment, it will be understood by those skilled in the art that changes in form and detail may be made without departing from the spirit and scope of the invention.

We claim:

1. A mechanism for positioning an output member comprising a step motor, a mechanical transmission connecting said step motor to said output member, and means for controlling said step motor, wherein the improvement comprises:

means in said controlling means providing a movement command specifying a number of steps to be performed by said step motor;

means for delivering units of electrical energy to said step motor in response to the number of steps specified to be performed by said step motor to move said output member to a desired position, each of said units being delivered in succession to said motor to urge movement of said motor in the same direction, said electrical energy delivering means comprising;

means for detecting the condition that a single step remains to be performed; and means responsive to whether a single remaining step is detected for selectively supplying electrical energy units to said step motor at different energy time rates, wherein the rate at which an energy unit for a single remaining step delivers energy to said step motor is substantially slower than the rate at which energy is supplied by units delivered for the other steps specified to be performed by said step motor.

2. The mechanism as defined in claim 1 further comprising means for detecting that a single step only is specified to be performed and said means for selectively supplying energy units is responsive to said single step only detection to deliver an energy unit to said step motor which supplies energy to said step motor at a rate that is substantially slower than the rate at which energy is supplied by the units delivered for said other steps, but which is faster than the rate at which energy is supplied for the last remaining step of a series of steps.

3. The mechanism as defined in claim 1 wherein said energy units are each supplied in the form of a series of current pulses and further wherein said energy unit for said last remaining step comprises a series of current pulses of increasing frequency.

4. The mechanism as defined in claim 1 wherein said means for delivering energy units comprises a current switch, means for periodically activating said current switch, and at least two stored sets of data each specifying a different series of time sequences for periodically activating said current switch according to the rate at which energy is to be supplied to said step motor.

5. The mechanism as defined in claim 2 wherein said means for delivering energy units comprises a current switch, means for periodically activating said current switch, and three stored sets of data each specifying a different series of time sequences for periodically activating said current switch according to the rate at which energy is to be supplied to said step motor.

6. The mechanism as defined in claim 1 wherein said energy unit for said last remaining step delivers current at an essentially exponentially increasing rate.

7. The mechanism as defined in claim 1 wherein said energy unit for said last remaining step delivers a total unit of energy to said step motor that is greater than the energy delivered to said other steps.

* * * * *